United States Patent Office 2,718,508
Patented Sept. 20, 1955

2,718,508
ORGANOSILICON PAINT RESINS

Lawrence A. Rauner, Midland, Mich., assignor to Dow Corning Corporation, Midland, Mich., a corporation of Michigan No Drawing. Application October 27, 1952,
Serial No. 317,135

2 Claims. (Cl. 260—22)

This invention relates to organosilicon air drying paints.

This invention is a continuation-in-part of the applicant's copending application Serial Number 262,893, filed December 21, 1951, now abandoned.

Heretofore, it has not been possible to produce an oil base paint which would adhere satisfactorily to ceramic surfaces. By ceramic is meant particularly such things as asbestos siding for buildings, concrete and brick walls, and cinder blocks. It has been suggested that the reason for this non-adherence was due to the alkalinity of the base member.

It is an object of this invention to prepare an air drying outdoor paint which will adhere to ceramic surfaces and which will retain its surface gloss for a prolonged period of time.

This invention relates to a resinous composition composed of from 25 to 35 per cent by weight of an alkoxylated organosilicon compound, from 20 to 30 per cent by weight of a fatty acid containing from 12 to 20 carbon atoms in the molecule and having an iodine number of at least 125, from 12 to 18 per cent by weight glycerine and from 25 to 40 per cent phthalic anhydride.

The organosilicon compositions employed in this invention are alkoxylated phenylmethylorganosilicon materials having from 0.8 to 2 alkoxy groups per silicon. All of the silicon atoms may have both a phenyl and a methyl radical attached thereto or up to 50 per cent of the silicon atoms may have only a phenyl group attached thereto. The remaining valences of the silicon, if any, are satisfied by oxygen atoms.

The alkoxy groups of the organosilicon compound are preferably those which have less than 5 carbon atoms. Thus the alkoxy groups may be, for example, methoxy, ethoxy, isopropoxy, or tertiary butoxy.

Specific examples of organosilicon compounds which may be employed are phenylmethyldiethoxysilane, phenylmethyldiisopropoxysilane, mixtures of phenylmethyldialkoxysilanes with up to 50 per cent phenyltrialkoxysilanes and partial hydrolyzates of phenylmethyldialkoxysilanes or partial hydrolyzates of mixtures of phenylmethyldialkoxysilanes and phenyltrialkoxysilanes. The partial hydrolyzates are actually polysiloxanes in which some of the silicon atoms have alkoxy groups attached thereto. Such materials are well known in the art.

The unsaturated fatty acids employed herein are those having from 12 to 20 carbon atoms and having an iodine number of at least 125. Specific acids which are operative are dehydrated castor oil acids, tung oil acids, linseed oil acids, soya bean oil acids and oiticica oil acids. These acids may be employed singularly or as mixtures of two or more thereof.

The various ingredients may be reacted in any desired manner. The order of the addition is not critical, although in order to facilitate handling, it is preferred that the phthalic anhydride be added after the reaction of the organosilicon compound with the glycerine and the fatty acid. In general, the reaction is carried out at temperatures ranging from 100 to 250° C. and is continued until the desired viscosity is obtained.

During the reaction alcohol and water are removed showing that actual chemical combination of the ingredients takes place. The finished resins are linked by the following type linkages: SiOC—, SiOSi, and COOC. The SiOSi linkage appears mostly in those materials in which partial hydrolyzates are employed.

After the resin has reached the desired viscosity it is dissolved in solvents such as toluene and may then be mixed with the desired pigments. If desired, solvents may also be employed during the reaction.

Pigments normally employed in oil base paints may be employed in the resins of this invention. In order to hasten drying, it is often desirable to incorporate drying catalysts such as metal naphthenates and octoates.

The materials of this invention may be applied to surfaces in the usual fashion for applying paints. They may be brushed or sprayed or applied with rollers.

The following examples are illustrative only and are not to be construed as limiting the invention which is properly delineated in the appended claims.

Example 1

675 parts by weight of a partially hydrolyzed alkoxy silane having the composition of 70 mol per cent phenylmethylsiloxane and 30 mol per cent monophenylsiloxane and having 1.21 isopropoxy groups per silicon atom was reacted with 520 parts by weight of a linseed fatty acid having a saponification value of 196.9 to 200.8 and an iodine value of 175 to 192 at a temperature of 200° C. until substantially the theoretical amount of isopropanol was removed. The mixture was cooled to below 140° C. and 159 parts by weight of glycerine were added. The temperature was again raised to 200° C. as $CO_2$ was passed through the mixture until substantially the theoretical amount of isopropanol was removed.

1350 parts by weight of the above reaction product was then reacted with a glycerol phthalate containing 207 parts by weight glycerine and 745 parts by weight of phthalic anhydride. Reaction was carried out at a temperature of from 200 to 210° C. until the resin began to wrap around the stirrer. The mixture was then diluted with 2,200 parts by weight of xylene to give a homogeneous solution.

The resin was compounded with a pigment composed of 70 per cent by weight titania and 30 per cent ferric oxide. The resin and pigment were employed in amount of one part by weight of each. There was also incorporated in the mixture .03 per cent cobalt added as the octoate, .03 per cent manganese added as the octoate and .05 per cent calcium added as the octoate all based upon the weight of the resin. Enough of a mixture of toluene and petroleum naphtha was added to bring the mixture to spraying consistency and the paint was sprayed onto asbestos cement siding on the outside of a building. The paint shows excellent color retention, gloss retention and adhesion.

Example 2

Resin equivalent to those of Example 1 are obtained when phenylmethyldimethoxysilane is employed in the procedure of Example 1.

Example 3

Resins equivalent to those of Example 1 are obtained when the following fatty acids are employed in the procedure of that example: dehydrated castor oil acids, oiticica oil acids, soya bean oil acids and a mixture of 1 part by weight tung oil acids and 3 parts by weight of dehydrated castor oil acids.

That which is claimed is:
1. A resinous composition composed of from 25 to 35 per cent by weight of an organosilicon composition containing from 0.8 to 2 silicon bonded alkoxy groups of less than 5 carbon atoms per silicon atom, in which organosilicon composition the silicon atoms have both methyl and phenyl radicals attached thereto and in which from 0 to 50 per cent of said atoms have only phenyl groups attached thereto, any remaining valences of the silicon being satisfied by oxygen atoms, from 20 to 30 per cent by weight of an unsaturated fatty acid of from 12 to 20 carbon atoms, said acid having an iodine number of at least 125, from 12 to 18 per cent by weight glycerine, and from 25 to 40 per cent by weight phthalic anhydride.

2. A paint composed of the reaction product of from 25 to 35 per cent by weight of an organosilicon composition containing from 0.8 to 2 silicon bonded alkoxy groups of less than 5 carbon atoms per silicon atom, in which organosilicon composition the silicon atoms have both phenyl and methyl radicals attached thereto and in which from 0 to 50 per cent of said atoms have only phenyl groups attached thereto, any remaining valences of the silicon being satisfied by oxygen atoms, from 20 to 30 per cent by weight of a fatty acid of from 12 to 20 carbon atoms, said acid having an iodine number of at least 125, from 12 to 18 per cent by weight glycerine, from 25 to 40 per cent by weight phthalic anhydride and a pigment.

References Cited in the file of this patent

UNITED STATES PATENTS

| | | |
|---|---|---|
| 2,587,295 | Doyle et al. | Feb. 26, 1952 |
| 2,589,243 | Goodwin et al. | Mar. 18, 1952 |